(12) United States Patent
Shimizu et al.

(10) Patent No.: US 9,017,599 B2
(45) Date of Patent: Apr. 28, 2015

(54) SLIDING PART AND METHOD OF MANUFACTURING THE SAME

(75) Inventors: Teruo Shimizu, Tokyo (JP); Tsuneo Maruyama, Niigata (JP)

(73) Assignee: Diamet Corporation, Niigata-Shi (JP)

( * ) Notice: Subject to any disclaimer, the term of this patent is extended or adjusted under 35 U.S.C. 154(b) by 321 days.

(21) Appl. No.: 13/486,708

(22) Filed: Jun. 1, 2012

(65) Prior Publication Data

US 2012/0244029 A1 Sep. 27, 2012

Related U.S. Application Data

(62) Division of application No. 11/911,842, filed as application No. PCT/US2005/020802 on Nov. 14, 2005, now abandoned.

(30) Foreign Application Priority Data

Apr. 20, 2005 (JP) ................. 2005-123009

(51) Int. Cl.
*B22F 3/12* (2006.01)
*F16C 33/14* (2006.01)
(Continued)

(52) U.S. Cl.
CPC ............. *F16C 33/14* (2013.01); *B22F 5/106* (2013.01); *F16C 33/12* (2013.01); *B22F 2998/00* (2013.01); *B22F 2998/10* (2013.01)

(58) Field of Classification Search
CPC ................... B22F 5/106; B22F 1/055
USPC .......................................... 419/23
See application file for complete search history.

(56) References Cited

U.S. PATENT DOCUMENTS 6,015,775 A   1/2000   Takayama et al.
7,361,203 B2  4/2008   Shimizu et al.
(Continued)

FOREIGN PATENT DOCUMENTS

EP   1541263     6/2005
GB   2242912 A   10/1991
JP   2001-303217 10/2001
(Continued)

OTHER PUBLICATIONS

European Search Report issued Feb. 26, 2010 for the corresponding European Patent Application No. 05805844.7.
(Continued)

*Primary Examiner* — Jessee Roe
*Assistant Examiner* — Christopher Kessler
(74) *Attorney, Agent, or Firm* — Leason Ellis LLP.

(57) ABSTRACT

There is provided a sliding part in which a surface coverage ratio of copper in the sliding part increases. A bearing which is the sliding part is formed by filling the raw powder into the filling portion of the forming mold, compacting the raw powder to form a powder compact, which is sintered. A copper-based raw powder is composed of a copper-based flat raw powder whose diameter is smaller than that of an iron-based raw powder and an aspect ratio larger than that of the iron-based raw powder, and a copper-based small-sized raw powder whose diameter is smaller than that of the copper-based flat raw powder. The copper is allowed to segregate at the surface of the sliding part. The surface of the bearing is covered with the copper-based small-sized raw powder and the copper-based flat raw powder, thereby the surface coverage ratio of copper can be increased.

7 Claims, 6 Drawing Sheets

(51) Int. Cl.
*B22F 5/10* (2006.01)
*F16C 33/12* (2006.01)

(56) References Cited

U.S. PATENT DOCUMENTS

2004/0182200 A1  9/2004  Takiguchi et al.
2005/0265884 A1  12/2005  Shimizu et al.

FOREIGN PATENT DOCUMENTS

| | | |
|---|---|---|
| JP | 2003-221606 A | 8/2003 |
| JP | 2004-59966 A | 2/2004 |
| JP | 2004-84038 A | 3/2004 |
| WO | WO-2004-020129 | 3/2004 |

OTHER PUBLICATIONS

European Search Report issued Feb. 26, 2010 for the corresponding European Patent Application No. 05806301.7.

SLIDING PART AND METHOD OF MANUFACTURING THE SAME

CROSS-REFERENCE TO RELATED PATENT APPLICATIONS

This application is a Divisional of U.S. patent application Ser. No. 11/911,842, filed Oct. 18, 2007, now abandoned, which is a U.S. National Phase application under 35 U.S.C. §371 of International Patent Application No. PCT/US2005/020802, filed Nov. 14, 2005, which claims the benefit of Japanese Patent Application No. 2005-123009, filed Apr. 20, 2005, all of which are incorporated by reference herein. The International Application was published in Japanese on Nov. 2, 2006 as International Publication No. WO 2006/114911 under PCT Article 21(2).

FIELD OF THE INVENTION

The present invention relates to a sliding part such as a bearing or the like and a method of manufacturing the same.

BACKGROUND OF THE INVENTION

As a sliding part having reduced frictional resistance and improved durability and generating no noise, a sliding part is known that is a flat powder formed by sintering a powder compact, which is fabricated by filling an iron-based raw powder and a copper-based raw powder in a filling portion of a forming mold and applying vibration to the mold at the same time for compacting, and having an aspect ratio of the copper-based raw powder larger than that of the iron-based raw powder, on a surface of which copper segregates (for example, refer to Japanese Unexamined Patent Application, First Publication No. 2003-221606); or a sliding part that is a flat powder formed by sintering a powder compact, which is fabricated by filling the iron-based raw powder and the copper-based raw powder into the filling portion of the forming mold and applying vibration to the mold at the same time for compacting, and having an average value of a maximum projected area of the copper-based raw powder larger than that of the iron-based raw powder, in which the copper-base raw powder contains flat powder of copper or copper-alloy and on a surface of which copper segregates (for example, refer to Japanese Unexamined Patent Application, First Publication No. 2004-84038).

SUMMARY OF INVENTION

Problems to be Solved by the Invention

However, in the above related art, the mixture of the iron-based raw powder and the copper-based flat raw powder composed of flat powder having a larger aspect ratio than the iron-based raw powder is filled into the filling portion of the forming mold, and at the same time vibration is applied to the forming mold, such that the copper-based flat raw powder segregates at the outer side within the filling portion, overlaps each other in the thickness direction, and at the same time segregates at a gathering surface in a state in which the direction intersecting the thickness direction is aligned with the longitudinal direction of the surface. However, the iron-based raw powder emerges at a part of the surface, as well as the segregated copper-based flat raw powder, and a gap is formed between the copper-based flat raw powders which emerges at the surface and are adjacent to each other. As a result, the gap between the copper-based raw powder and the iron-based raw powder, or the gap between the copper-based flat raw powders is formed in the surface. Due to these gaps, the surface coverage ratio of the copper in the sliding part cannot be increased.

Accordingly, it is an advantage of the present invention to increase the surface coverage ratio of the copper in the sliding part formed by filling the iron-based raw powder and the copper-based raw powder having an aspect ratio larger than that of the iron-based raw powder into the filling portion of the forming mold, compacting the raw powders to form a powder compact, and sintering the powder compact, in which the copper segregates at the surface of the sliding part.

Means for Solving the Problem

According to a first aspect of the invention, a sliding part is formed by filling an iron-based raw powder and a copper-based raw powder into a filling portion of a forming mold, compacting the raw powders to form a powder compact, and sintering the powder compact. The copper-based raw powder is composed of a copper-based flat raw powder having an average diameter smaller than that of the iron-based raw powder and an aspect ratio larger than that of the iron-based raw powder; and a copper-based small-sized raw powder having the average diameter smaller than that of the copper-based flat raw powder; and in which copper is allowed to segregate on a surface of the sliding part.

According to a second aspect of the invention, in the sliding part according to the first aspect, the surface coverage ratio of copper in the sliding part is 80% or more.

According to a third aspect of the invention, in the sliding part according to the first or second aspect, the aspect ratio of the copper-based flat raw powder is 10 or more.

According to a fourth aspect of the invention, in the sliding part according to the second aspect, the ratio of the copper-based raw powder is 20 to 40% by weight with respect to all raw powders.

According to a fifth aspect of the invention, a sliding part is formed by filling an iron-based raw powder and a copper-based raw powder into a filling portion of a forming mold, compacting the raw powders to form a powder compact, and sintering the powder compact. The copper-based raw powder consists of a copper-based flat raw powder having an average value of a maximum projected area smaller than that of the maximum projected area of the iron-based raw powder and an aspect ratio larger than that of the iron-based raw powder; and a copper-based small-sized raw powder having the average value of the maximum projected area smaller than that of the maximum projected area of the copper-based flat raw powder; and in which copper is allowed to segregate on a surface of the sliding part.

According to a sixth aspect of the invention, in the sliding part according to the fifth aspect, a surface coverage ratio of copper in the sliding part is 80% or more.

According to a seventh aspect of the invention, a method of manufacturing a sliding part, includes steps of filling an iron-based raw powder and a copper-based raw powder into a filling portion of a forming mold, compacting the raw powders to form a powder compact, and sintering the powder compact, in which the copper-based raw powder consists of a copper-based flat raw powder having the average diameter smaller than that of the iron-based raw powder and an aspect ratio larger than that of the iron-based raw powder; and a copper-based small-sized raw powder having an average diameter smaller than that of the copper-based flat raw powder; and the copper-based flat raw powder in the filling portion is allowed to segregate on a surface of the powder compact.

According to an eighth aspect of the present invention, a method of manufacturing a sliding part, includes steps of filling an iron-based raw powder and a copper-based raw powder into a filling portion of a forming mold, compacting the raw powders to form a powder compact, and sintering the powder compact, in which the copper-based raw powder is composed of a copper-based flat raw powder having an average value of the maximum projected area smaller than that of the maximum projected area of the iron-based raw powder and an aspect ratio larger than that of the iron-based raw powder; and a copper-based small-sized raw powder having an average value of the maximum projected area smaller than that of the maximum projected area of the copper-based flat raw powder, in which the copper-based flat raw powder in the filling portion is allowed to segregate on a surface of the powder compact.

According to a ninth aspect of the invention, in the method of manufacturing the sliding part according to the seventh or eighth aspect, the aspect ratio of the copper-based flat raw powder is 10 or more.

According to a tenth aspect of the invention, in the method of manufacturing the sliding part according to any one of the seventh to ninth aspects, a ratio of the copper-based raw powder is 20 to 40% by weight with respect to all raw powders.

Effects of the Invention

According to the first and fifth aspects of the present invention, when a bearing is composed of the sliding part, the copper-based small-sized raw powder as well as the copper-based flat raw powder emerges at the surface, such that a rotator slides on the surface covered with the copper, and the coefficient of the friction between the rotation axis and the surface side decreases, thus a rotation is performed smoothly. At the same time, predetermined strength and durability can be obtained due to the iron. Furthermore, in the above structure, even though the surface on which the rotator rotates is abraded, since the predetermined ratio of copper is contained below the surface, the durability of the sliding portion becomes excellent.

According to the second and sixth aspects of the present invention, the coefficient of the friction of the sliding portion can be suppressed at a significantly lower level.

According to the third and ninth aspects of the present invention, since the aspect ratio is set to 10 or more, when vibration is applied, the flat powder segregates easily at the surface, and thus it is possible to obtain the sliding part having a high copper concentration at the surface.

According to the fourth aspect of the present invention, when the ratio of the copper-based flat raw powder is less than 20% by weight, the ratio of copper at the surface decreases and the frictional resistance increases. In addition, when the ratio of copper-based flat raw powder exceeds 40% by weight, the ratio of the copper-based raw powder in all of the raw powders becomes too large, and it is not favorable in terms of the strength. Therefore, if the ratio is set in the range of 20 to 40%, the frictional resistance decreases and it is possible to obtain a sliding part having a high strength.

According to the seventh and eighth aspects of the present invention, it is possible to obtain a sliding part having a low coefficient of friction and an improved durability.

According to the tenth aspect of the present invention, when the ratio of the copper-based flat raw powder is less than 20% by weight, the ratio of copper at the surface decreases and the frictional resistance increases. In addition, when the ratio of the copper-based flat raw powder exceeds 40% by weight, the ratio thereof becomes too large and it is not favorable in terms of the strength. Therefore, if the ratio is set in the range of 20% to 40% by weight, the frictional resistance decreases and it is possible to obtain a sliding part having a high strength.

BRIEF DESCRIPTION OF THE REFERENCE SYMBOLS

Figure 1:
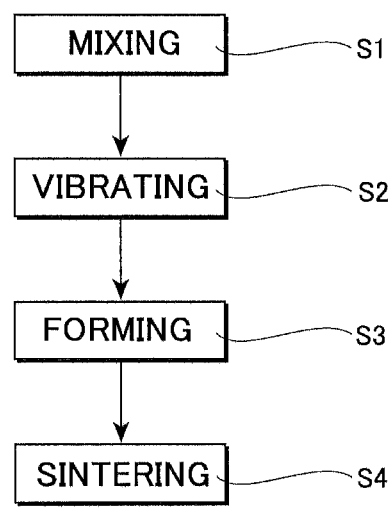
FIG. 1 is a flowchart illustrating a manufacturing method according to a first embodiment of the present invention.

1: iron-based raw powder
2: copper-based flat raw powder
3: copper-based small-sized raw powder
5: bearing
6: powder compact
11: forming mold
16: filling portion
51: sliding surface (sliding part)

DETAILED DESCRIPTION OF THE INVENTION

Best Mode for Carrying Out the Invention

Hereinafter, a preferred embodiment of the present invention will be described with reference to the attached drawings. However, the embodiment to be described below is not intended to limit the invention described in claims. Furthermore, the entire constitutions to be described later are not essential to the invention.

Embodiment 1

Figure 2:
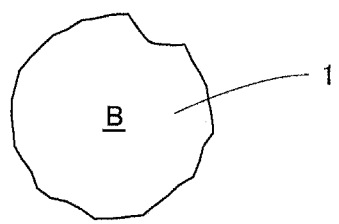
FIG. 2 is a schematic front elevation view of an iron-based raw powder according to the first embodiment of the present invention.
Figure 3A:
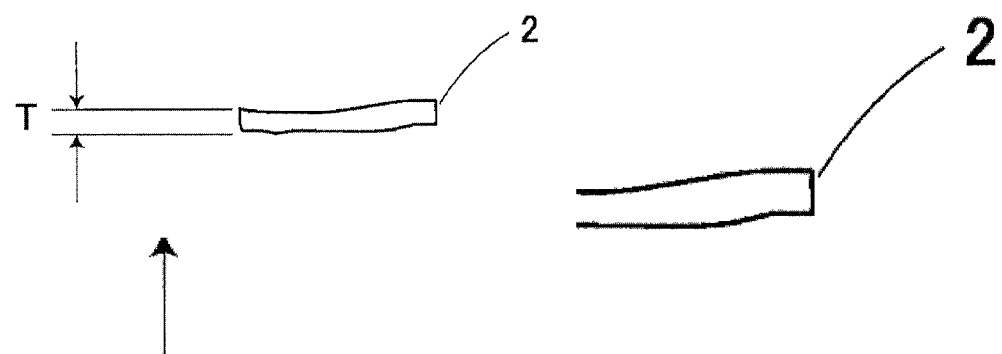
FIG. 3(A) is a schematic side elevation view illustrating a copper-based raw powder according to the first embodiment of the present invention.
Figure 3B:
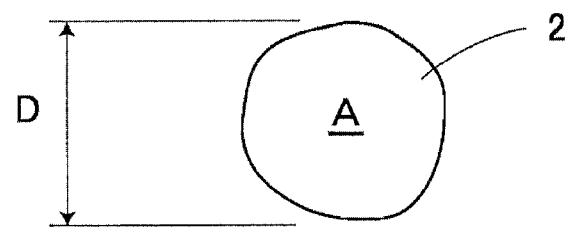
FIG. 3(B) is a schematic front elevation view illustrating a copper-based raw powder according to the first embodiment of the present invention.
Figure 4:
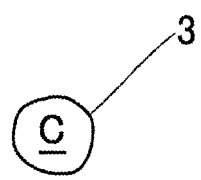
FIG. 4 is a schematic front elevation view of a copper-based small-sized raw powder according to the first embodiment of the present invention.

A method of manufacturing the invention will now be described. An iron-based raw powder 1, a copper-based flat raw powder 2, and a copper-based small-sized raw powder 3 are mixed at a predetermined ratio (S1). As shown in FIG. 2, as the iron-based raw powder 1, an irregular-shaped powder having a substantially spherical shape such as an atomized powder is used. An average diameter of the iron-based raw powder 1 is in the range of 50 to 100 μm, but is preferably in the range of 60 to 80 µm. Furthermore, as shown in FIG. 3, a flat powder is used as the copper-based raw material 2. An aspect ratio (diameter D/thickness T) of the flat powder is 10% or more, but is preferably in the range of 20 to 50%. The average diameter D of the copper-based flat raw powder 2 is 80 µm, and the average thickness T is in the range of 1 to 5 µm. Furthermore, as the copper-based flat raw powder 2, it is possible to use a mixture consisting of a copper powder as the main component and a tin powder in the range of 2 to 30% by weight. Furthermore, as shown in FIG. 4, an irregular-shaped powder having a substantially spherical shape is used as the copper-based small-sized raw powder 3. The average diameter of the copper-based small-sized raw powder 3 is in the range of 30 to 50 µm, but is preferably 20 µm.

Herewith, the average diameter of the copper-based flat raw powder 2 becomes smaller than that of the iron-based raw powder 1, and becomes larger than that of the copper-based small-sized raw powder 3. Due to the above comparative difference in size, the average value of the maximum projected area A of the copper-based flat raw powder 2 becomes smaller than that of the maximum value of the projected area B of the iron-based raw powder 1, and the average value of the maximum projected area A becomes larger than that of the maximum projected area C of the copper-based small-sized raw powder 3.

Figure 5:
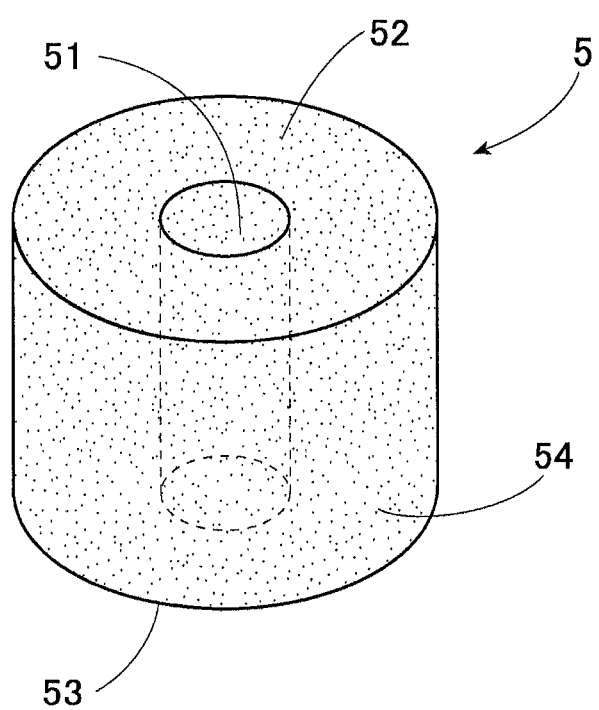
FIG. 5 is a perspective view illustrating a bearing according to the first embodiment of the present invention.

As shown in FIG. 5, a bearing 5 has a substantially cylindrical shape and a substantially cylindrical-shaped sliding surface 51, on which a rotational shaft, which is a rotator (not shown), rotationally slides, is formed at the center of the bearing 5. At both sides in the longitudinal direction of the sliding surface 51, which is a sliding portion, flat end surfaces 52 and 53 are formed, and an outer circumferential surface 54 thereof is formed like a cylindrical shape.

The mixture (mixed at S1) of the iron-based raw powder 1, the copper-based flat raw powder 2, and the copper-based small-sized raw powder 3 is filled into a filling portion 16 of a forming mold 11. In the mixed powder filled into the filling portion 16, a ratio of the copper-based flat raw powder is 20 to 40% by weight with respect to all raw powders.

Figure 6:
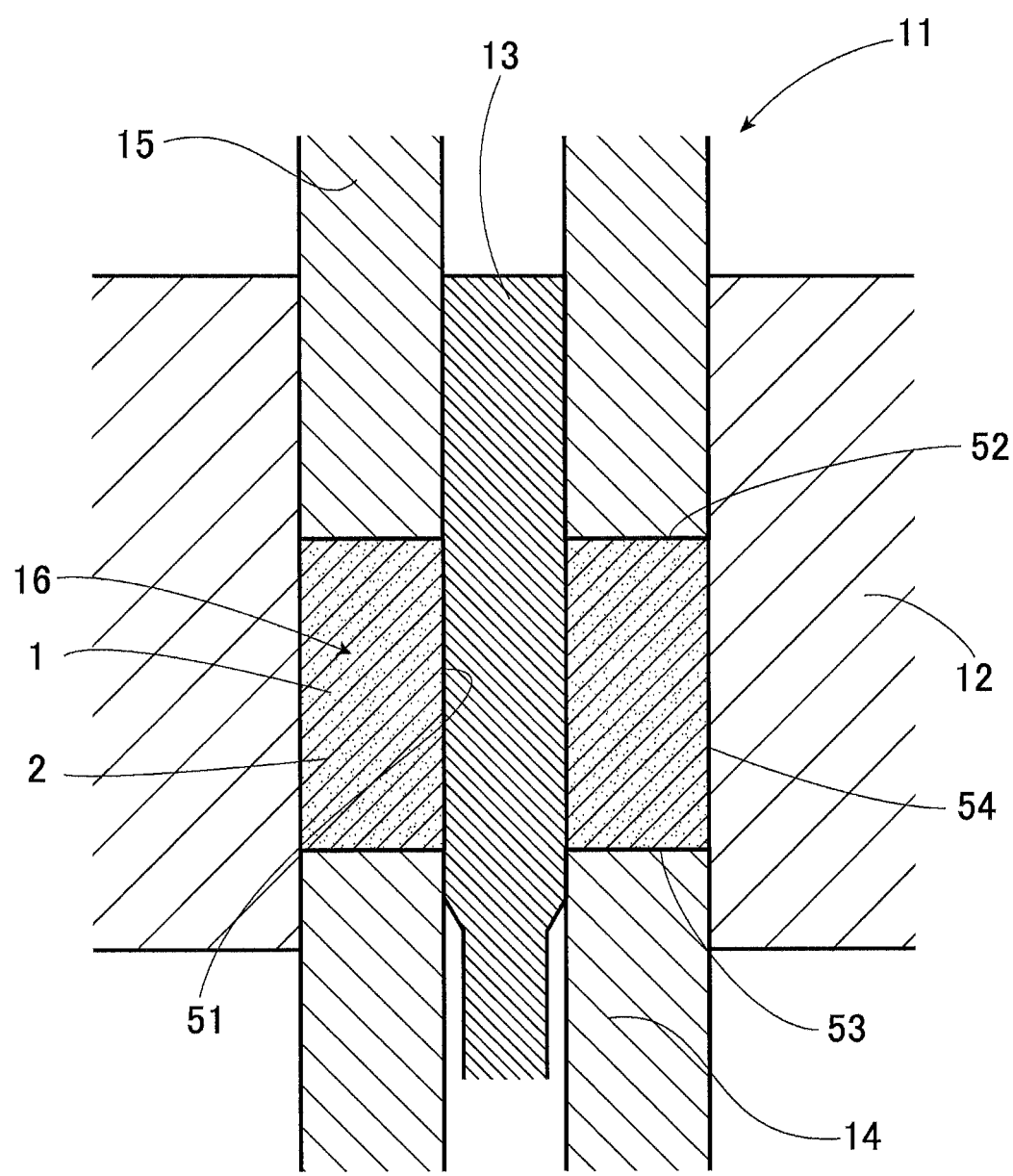
FIG. 6 is a sectional view illustrating a forming mold according to the first embodiment of the present invention.

FIG. 6 is an example of the forming mold 11. The forming mold 11 includes a die 12, a core rod 13, a lower-side punch 14, and an upper-side punch 15. A vertical direction of the forming mold 11 is an axial direction (a vertical axial direction of the press). The die 12 has a substantially cylindrical shape, and the core rod 13 having a substantially cylindrical shape is coaxially positioned in the die 12. The lower-side punch 14 has a substantially cylindrical shape and is fitted between the die 12 and the core rod 13 from the lower side, so that the lower-side punch 14 can move in the vertical direction. The upper punch 15 has a substantially cylindrical shape and is fitted between the die 12 and the core rod 13 from the upper side, so that the upper-side punch 15 can move in the vertical direction and in such a manner as to be freely detachable. Furthermore, the filling portion 16 is formed among the die 12, the core rod 13, and the lower-side punch 14. An inner circumferential surface of the die 12 forms the outer circumferential surface 54. An upper surface of the lower-side punch 14 forms the end surface 53. A lower surface of the upper-side punch 15 forms the end surface 52. The outer circumferential surface of the core rod 13 forms the sliding surface 51.

As shown in FIG. 6, the mixture of the iron-based raw powder 1, the copper-based flat raw powder 2, and the copper-based small-sized raw powder 3 is filled into the filling portion 16, and a vibration is applied to the mixture of the raw materials 1 to 3 (S2). In this case, the upper side of the filling portion 16 is closed by the upper-side punch 15, and vibration is applied to the filling portion 16 at the accelerating speed of 0.01 to 3G without pressing the punches 14 and 15. When the vibration is applied to the filling portion 16, the copper-based flat raw powder 2, which is flat powder, segregates at the outer side within the filling portion 16, that is, at the sliding surface 51 or the outer circumferential surface 54, overlaps each other in the thickness direction, and gathers so as to make the direction intersecting the thickness direction aligned with the longitudinal direction of the surface. In addition, the iron-based raw powder 1 sometimes emerges between the copper-based flat raw powders 2 as well as the segregated copper-based flat raw powder 2 in the outer side within the filling portion 16. However, the copper-based small-sized raw powder 3A intrudes into the gap formed between the iron-based raw powder 1 and the copper-based flat raw powder 2 and then emerges at the outer side, or the copper-based small-sized raw powder 3B intrudes into the gap formed between the copper-based flat raw powders 2 and then emerges at the outer side. As a result, the surface coverage ratio of copper in the sliding surface 51 becomes 80% or more, or 85% or more. The surface coverage ratio of copper means the surface coverage ratio not including the hole region, like the surface coverage ratio of copper in the latter related art.

Furthermore, since the flat surface of the copper-based raw powder 2 is wide, it is possible to segregate the copper-based raw powder 2 at the outer side within the filling portion 16 by generating static electricity on the surface of the forming mold 11 surrounding the filling portion 16, or it is possible to segregate the copper-based raw powder 2 at the outer side within the filling portion 16 by using magnetic force as well as the vibration.

On the other hand, the remaining copper-based flat raw powder 2A at the inner side that has not segregated at the outer side within the filling portion 16, that is, the sliding surface 51 and the outer circumferential surface 54 are disposed to surround the iron-based raw powder 1 with the plurality of copper-based small-sized raw powders 3.

Figure 7:
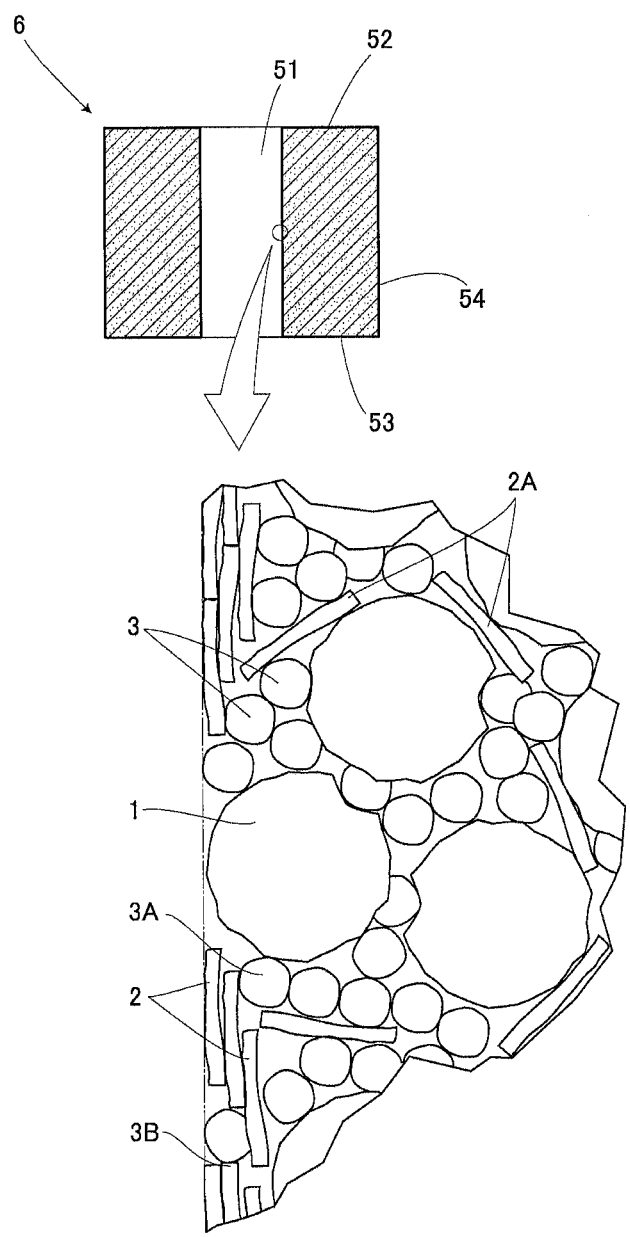
FIG. 7 is a schematic sectional view illustrating a powder compact according to the first embodiment of the present invention, in which a portion of the powder compact is enlarged.

Then, the upper-side and lower-side punches 15 and 14 press the mixture of the raw powders 1 to 3 within the filling portion 16 to form a powder compact 6 (S3). As shown in FIG. 7, the copper-based flat raw powder 2, which is a flat powder, emerges at the surface, and the ratio of the iron-based raw powder 1 increases as it goes toward the inner side of the powder compact 6. The powder compact 6 is sintered (S4) to form a sintered bearing 5. A post process such as a sizing process or an oil impregnation process is performed on the bearing 5, if needed.

In the above embodiment, in accordance with the first aspect, in the bearing 5 which is a sliding part formed by filling the raw powder into the filling portion 16 of the forming mold 11, compacting the raw powder to form a powder compact 6, and sintering the powder compact 6, the copper-based raw powder is composed of the copper-based flat raw powder 2 having an average diameter smaller than that of the iron-based raw powder 1 and an aspect ratio larger than that of the iron-based raw powder 1; and the copper-based small-sized raw powder 3 having an average diameter smaller than that of the copper-based flat raw powder 2, and the copper is allowed to segregate at the surface of the sliding part. Therefore, the copper-based raw powder 2, which is a flat powder, and the iron-based raw powder 1 are filled into the filling portion 16, and the vibration is applied thereto, such that the copper-based flat powder segregates at the surface. Furthermore, in the obtained bearing 5, the surface is covered with the copper-based small-sized raw powder 3 emerged on the surface as well as the copper-based flat raw powder 2, thereby it is possible to increase the surface coverage ratio of copper.

Therefore, the rotator slides on the sliding surface 51 which is covered with the copper, and the coefficient of friction between the rotation axis and the sliding surface 51 becomes small, thereby the rotation performs smoothly. In addition, the predetermined strength and the durability can be obtained due to the iron. Furthermore, in the above structure, even though the sliding surface 51, on which the rotator rotates, is abraded, since a predetermined ratio of copper is contained below the sliding surface 51, the durability of the sliding portion becomes excellent.

Furthermore, in the above embodiment, in accordance with the second and sixth aspects, since the surface coverage ratio of copper in the sliding surface 51, which is the sliding portion, is 80% or more, it is possible to suppress the coefficient of the friction at a significantly lower level.

Furthermore, in the above embodiment, in accordance with the third and ninth aspects, since the aspect ratio of the copper-based flat raw powder 2 is set to 10 or more, when a vibration is applied, the copper-based flat powder 2 segregates easily at the surface, and it is possible to obtain the bearing 5 having a high copper concentration at the surface.

Furthermore, in the above embodiment, in accordance with the fourth aspect, since the ratio of the copper-based flat raw powder 2 is set in the range of 20% to 40%, it is possible to obtain a bearing 5 having low frictional resistance and high strength.

Furthermore, in the above embodiment, in accordance with the fifth aspect, in the bearing 5 formed by filling the raw powder into the filling portion 16 of the forming mold 11, compacting the raw powder to form the powder compact 6, and sintering the powder compact 6, the copper-based raw powder is composed of the copper-based flat raw powder 2 having an average value of the maximum projected area A smaller than the average value of the maximum projected area B of the iron-based raw powder 1 and an aspect ratio larger than that of the iron-based raw powder 1; and the copper-based small-sized raw powder 3 having the average value of the maximum projected area C smaller than that of the maximum projected area A of the copper-based flat raw powder 2, and the copper is allowed to segregate at the surface of the sliding part. Therefore, the copper-based raw powder 2, which is a flat powder, and the iron-based raw powder 1 are filled into the filling portion 16, and the vibration is applied thereto, such that the copper-based flat powder segregates at the surface. Furthermore, in the obtained bearing 5, the surface is covered with the copper-based small-sized raw powder 3 that has emerged on the surface as well as the copper-based flat raw powder 2, thereby it is possible to increase the surface coverage ratio of copper.

Furthermore, in the above embodiment, in accordance with the seventh and eighth aspects, the surface is covered with the copper-based small-sized raw powder 3 that has emerged at the surface as well as the copper-based flat raw powder 2 appear, it is possible to obtain the bearing 5, the surface coverage ratio of copper of which increases.

Furthermore, in the above embodiment, in accordance with the tenth aspect, since the ratio of the copper-based raw powder is set in the range of 20% to 40% by weight with respect to all of the raw powders, the frictional resistance decreases and it is possible to obtain the sliding part having a high strength.

Furthermore, the present invention is not limited to the above embodiment, and various modifications can be made. For example, the flat powder can include a rod-shaped powder. In this case, the ratio of the length and the diameter becomes the aspect ratio.

INDUSTRIAL APPLICABILITY

The above sliding part and the method of manufacturing the same according to the aspects of the invention can be applied to various sliding parts in addition to the bearing.

What is claimed is:

1. A method of manufacturing a sliding part comprising:
    filling an iron-based raw powder and a copper-based raw powder into a filling portion of a forming mold;
    vibrating the filling portion of the forming mold at the accelerating speed of between 0.01 to 3G, wherein the powders filing the forming mold are uncompressed;
    compacting the raw powders to form a powder compact; and
    sintering the powder compact,
    wherein the copper-based raw powder is comprised of a copper-based flat raw powder having an average diameter smaller than that of the iron-based raw powder and an aspect ratio larger than that of the iron-based raw powder; and a copper-based small-sized raw powder having an average diameter smaller than that of the copper-based flat raw powder, and
    wherein part of the copper-based flat raw powders is segregated on the outer side within the filling portion by applying the vibration, and the grains of the copper-based small raw powder intrude into spaces formed between the grains of the iron-based raw powder to surround the grains of the iron-based raw powder by applying the vibration.

2. The method according to claim 1, wherein the aspect ratio of the copper-based flat raw powder is 10 or more.

3. The method according to claim 1, wherein a ratio of the copper-based raw powder is 20 to 40% by weight with respect to all raw powders.

4. A method of manufacturing a sliding part comprising:
    filling an iron-based raw powder and a copper-based raw powder into a filling portion of a forming mold;
    vibrating the filling portion of the forming mold at the accelerating speed of between 0.01 to 3G wherein the powders filing the forming mold are uncompressed;
    compacting the raw powders to form a powder compact; and
    sintering the powder compact,
    wherein the copper-based raw powder is comprised of a copper-based flat raw powder having an average value of a maximum projected area smaller than that of the maximum projected area of the iron-based raw powder and an aspect ratio larger than that of the iron-based raw powder; and a copper-based small-sized raw powder having an average value of a maximum projected area smaller than that of the maximum projected area of the copper-based flat raw powder, and
    wherein part of the copper-based flat raw powders is segregated on the outer side within the filling portion by applying the vibration, and the grains of the copper-based small raw powder intrude into spaces formed between the grains of the iron-based raw powder to surround the grains of the iron-based raw powder by applying the vibration.

5. The method according to claim 4, wherein the aspect ratio of the copper-based flat raw powder is 10 or more.

6. The method according to claim 4, wherein a ratio of the copper-based raw powder is 20 to 40% by weight with respect to all raw powders.

7. The method according to claim 2, wherein a ratio of the copper-based raw powder is 20 to 40% by weight with respect to all raw powders.

\* \* \* \* \*